Dec. 17, 1929. J. FINK Re. 17,525
LEG COVERING GARMENT
Original Filed July 6, 1926
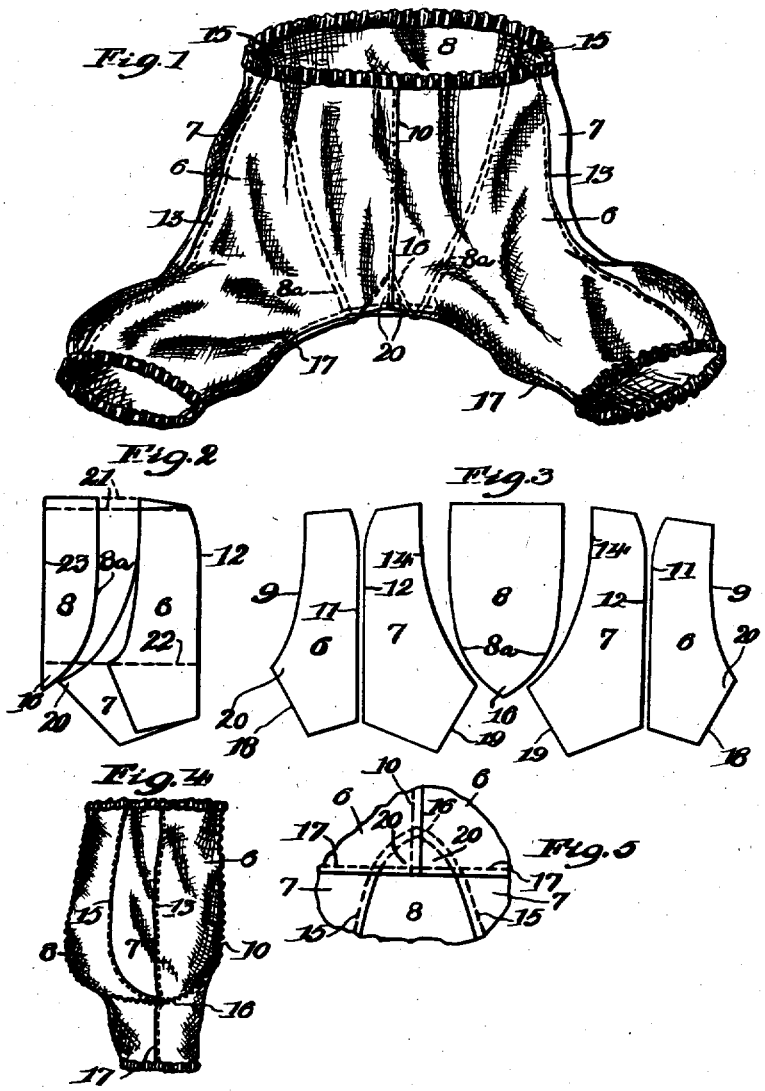
INVENTOR
Jacob Fink, deceased
by Rose J. Fink, administratrix
BY Stryker & Stryker
ATTORNEYS.

Reissued Dec. 17, 1929 Re. 17,525

UNITED STATES PATENT OFFICE

JACOB FINK, DECEASED, LATE OF ST. PAUL, MINNESOTA, BY ROSE J. FINK, ADMINISTRATRIX, OF ST. PAUL, MINNESOTA; SAID JACOB FINK ASSIGNOR TO SAID ROSE J. FINK

LEG-COVERING GARMENT

Original No. 1,705,008, dated March 12, 1929, Serial No. 120,646, filed July 6, 1926. Application for reissue filed October 28, 1929. Serial No. 402,975.

This invention relates to leg covering garments or bloomers and has for its object the provision of a garment of this class, which is unusually durable and adapted to permit unrestricted movement of the wearer.

More particularly, it is the object to form a leg covering garment from a plurality of pieces of fabric of novel form and so joined at the crotch as to minimize the number of folds of material and at the same time afford a maximum of strength at this point and ample fulness to permit free movement and proper conforming of the garment to the body of the wearer.

With these objects in view, the invention will be understood by reference to the accompanying drawings, in which Figure 1 is a perspective view of the improved garment, showing the front thereof and the arrangement of seams at the crotch; Fig. 2 is a composite view or tailor's pattern, illustrating the relative shapes of the several pieces from which the garment is formed; Fig. 3 shows the several pieces developed upon a plain surface; Fig. 4 is a central, vertical section of the garment and Fig. 5 is a plan view showing the arrangement of seams at the crotch.

As best shown in Fig. 3, the garment is formed from two similar front pieces 6, two similar back pieces 7 and a central or seat piece 8. The front pieces 6 are joined together along their side edges 9 to form a front seam 10, while the opposite side edges 11 of the pieces 6 are joined to the edges 12 of the pieces 7 to form side seams 13 in the finished garment. At the back of the garment, there is no central seam, the seat piece 8 being joined along its side edges $8^a$ to edges 14 of the pieces 7 to form two back seams 15, which extend from points on the waist line adjacent to the hips of the garment and converge to a pointed end 16 in the crotch. When the several pieces are laid flat, as before sewing them together, each side edge $8^a$ of the piece 8 is cut upon a curve at least a portion of which diverges relative to the adjacent edge 14, so that the pieces 8 and 7 when sewed together, are adapted to conform to the body of the wearer and give ample fulness to the seat of the garment. Inside leg seams 17 are formed by joining edges 18 of the pieces 6 and edges 19 of the pieces 7. These inside leg seams 17 are arranged to meet at the middle point of the crotch in the usual manner, and the front seam 10 terminates at the junction of the seams 17.

The pointed end portion 16 of the seat piece 8 overlaps corners 20, formed on the pieces 6 so that each back seam 15 along an edge $8^a$ meets a seam 17 at a point spaced to one side of the middle of the crotch. As shown in the pattern of Fig. 2, the waist lines 21 of the garment extend substantially parallel to a line 22 passing through the crotch of the garment and perpendicular to the vertical center line 23 of the seat piece 8.

By this peculiar form and arrangement of the seat piece 8, an unusually full seat is provided in the garment, as shown in Fig. 4, and the seams 15 are separated one from the other where they meet the inside leg seams at either side of the center of the garment, so that unusual fulness of material is provided in the crotch. Thus, free movement of the wearer is permitted without causing undue strains in any part of the garment. Further, by this arrangement of seams at the crotch, the number of folds of material is minimized, as compared with the common form of garment in which a central back seam meets the inside leg seams and front seam at a point, and a much more durable junction of material is provided at the crotch by reason of the overlapping arrangement of the pointed end 16 of the seat panel 8.

Having described the invention of said JACOB FINK what is claimed as new and desired to be protected by Letters Patent is:

In a leg covering garment, individual leg covering members having inside leg seams meeting in the crotch, said members being united by a front seam extending from the waist-line to a central point in the crotch, each of said members being substantially narrower at the waist-line than at the crotch, and the rear edge of each being substantially longer than the edges meeting at the front seam, and a seat piece interposed between and connecting the rear edges of the leg covering members to give fullness to the seat of the garment, a triangular portion of said seat piece overlapping the normally lower end of the front seam and forming a crotch reinforcement, the side edges of said seat piece crossing the inside leg seams at points removed from the central point in the crotch.

In testimony whereof, I have hereunto signed my name to this specification as administratrix of the estate of said JACOB FINK, deceased.

ROSE J. FINK,
*Administratrix of the Estate of Jacob Fink, Deceased.*